United States Patent
Yeo et al.

(10) Patent No.: US 9,057,456 B2
(45) Date of Patent: Jun. 16, 2015

(54) MICROFLUIDIC DEVICE, LIGHT IRRADIATION APPARATUS, MICORFLUIDIC SYSTEM COMPRISING THE SAME AND METHOD FOR DRIVING THE SYSTEM

(75) Inventors: Yeong Bae Yeo, Seoul (KR); Jong Gun Lee, Suwon-si (KR); Jin Tae Kim, Hwaseong-si (KR); Yong Moo Shin, Seongnam-si (KR); Jong Myeon Park, Incheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/940,092

(22) Filed: Nov. 5, 2010

(65) Prior Publication Data
US 2011/0121196 A1    May 26, 2011

(30) Foreign Application Priority Data
Nov. 20, 2009    (KR) ........................ 10-2009-0112881

(51) Int. Cl.
*F16K 99/00* (2006.01)
*B01L 3/00* (2006.01)

(52) U.S. Cl.
CPC ......... *F16K 99/003* (2013.01); *B01L 3/502738* (2013.01); *B01L 2300/0803* (2013.01); *B01L 2300/087* (2013.01); *B01L 2300/1861* (2013.01); *B01L 2400/0409* (2013.01); *B01L 2400/0677* (2013.01); *F16K 99/0001* (2013.01); *F16K 99/0032* (2013.01); *F16K 99/004* (2013.01); *F16K 2099/0084* (2013.01)

(58) Field of Classification Search
CPC .... B01L 9/52; B01L 2200/027; C12M 23/14; C12Q 2565/629
USPC .................................................. 250/428, 288
See application file for complete search history.

(56) References Cited

U.S. PATENT DOCUMENTS

| | | | | |
|---|---|---|---|---|
| 5,956,130 A | * | 9/1999 | Vancaillie et al. | 356/39 |
| 6,798,574 B2 | * | 9/2004 | Kim | 359/566 |
| 7,428,016 B2 | * | 9/2008 | Takenaka | 348/371 |
| 7,867,767 B2 | * | 1/2011 | Bedingham et al. | 436/45 |
| 2002/0151078 A1 | * | 10/2002 | Kellogg et al. | 436/45 |

(Continued)

FOREIGN PATENT DOCUMENTS

| | | |
|---|---|---|
| EP | 1 688 734 A1 | 8/2006 |
| EP | 1830174 A2 * | 9/2007 |

(Continued)

OTHER PUBLICATIONS

Communication, dated Nov. 26, 2013, issued by the European Patent Office in counterpart European Patent Application No. 10190865.5.

*Primary Examiner* — Jack Berman
*Assistant Examiner* — Jason McCormack
(74) *Attorney, Agent, or Firm* — Sughrue Mion, PLLC

(57) ABSTRACT

A microfluidic system includes a microfluidic device including a chamber which contains a fluid sample, a channel which is connected to the chamber and through which the fluid sample flows, and a valve which controls flow of the fluid sample through the channel; an irradiation apparatus which irradiates electromagnetic energy; and a diffuser which diffuses and distributes the electromagnetic energy irradiated by the irradiation apparatus to an irradiation region of the microfluidic device.

9 Claims, 8 Drawing Sheets

(56) References Cited

U.S. PATENT DOCUMENTS

| | | | |
|---|---|---|---|
| 2003/0047688 A1* | 3/2003 | Faris et al. | 250/432 R |
| 2004/0208792 A1* | 10/2004 | Linton et al. | 422/99 |
| 2005/0009101 A1* | 1/2005 | Blackburn | 435/7.1 |
| 2005/0174251 A1* | 8/2005 | Terry, III | 340/691.1 |
| 2006/0023306 A1* | 2/2006 | Miyata | 359/460 |
| 2006/0257290 A1* | 11/2006 | Shimizu | 422/100 |
| 2007/0121113 A1* | 5/2007 | Cohen et al. | 356/432 |
| 2008/0199930 A1* | 8/2008 | Lee et al. | 435/173.1 |
| 2008/0274015 A1* | 11/2008 | Park et al. | 422/72 |
| 2009/0021741 A1* | 1/2009 | Kim et al. | 356/440 |
| 2009/0066339 A1* | 3/2009 | Glezer et al. | 324/444 |
| 2009/0086331 A1* | 4/2009 | Gunasekaran et al. | 359/666 |
| 2009/0189089 A1* | 7/2009 | Bedingham et al. | 250/459.1 |
| 2009/0208072 A1* | 8/2009 | Seibel et al. | 382/128 |
| 2009/0267752 A1* | 10/2009 | Park | 340/461 |
| 2009/0323372 A1* | 12/2009 | Kurihara et al. | 362/620 |
| 2010/0064781 A1* | 3/2010 | Cherubini et al. | 73/64.56 |
| 2010/0086441 A1* | 4/2010 | Lee et al. | 422/68.1 |
| 2010/0120077 A1* | 5/2010 | Daridon | 435/29 |
| 2010/0284170 A1* | 11/2010 | Awaji et al. | 362/97.1 |
| 2011/0094600 A1* | 4/2011 | Bergeron et al. | 137/38 |
| 2012/0069585 A1* | 3/2012 | Hirota | 362/382 |

FOREIGN PATENT DOCUMENTS

| | | |
|---|---|---|
| EP | 1 905 515 A2 | 4/2008 |
| WO | 2005/098431 A1 | 10/2005 |
| WO | 2007/060523 A1 | 5/2007 |

* cited by examiner

MICROFLUIDIC DEVICE, LIGHT IRRADIATION APPARATUS, MICORFLUIDIC SYSTEM COMPRISING THE SAME AND METHOD FOR DRIVING THE SYSTEM

CROSS-REFERENCE TO RELATED APPLICATION

This application claims priority from Korean Patent Application No. 2009-0112881, filed on Nov. 20, 2009 in the Korean Intellectual Property Office, the disclosure of which is incorporated herein by reference.

BACKGROUND

1. Field

Apparatuses and methods consistent with exemplary embodiments relate to a microfluidic device, a light irradiation apparatus, a microfluidic system including the same, and a method for driving the same, and more specifically, to a microfluidic device, a light irradiation apparatus, a microfluidic system including the same, and a method for driving the same, to uniformly heat a fluid sample present in the microfluidic device or smoothly operate a valve.

2. Description of the Related Art

Generally, microfluidic devices used for operations utilizing a small amount of fluid include a chamber to retain a small amount of fluid, a channel through which the fluid flows, and a valve to control fluid flow. A device to perform experiments including biochemical reactions on a small chip is referred to as a biochip, in particular, a device wherein treatment and operations of fluids through a series of steps are performed on one chip is referred to as a lab-on-a-chip.

A driving pressure is required to transfer fluids in a microfluidic device. Capillary pressure or pressure applied by an additional pump is used as driving pressure. Recently, a disc-shaped microfluidic device, called a "Lab CD" or "Lab-on-a-CD" in which chambers and channels are arranged rotates to operate fluids through centrifugal force.

Various valve techniques to control fluid flows in these microfluidic devices are being researched. At present, thermally activated valves using a material to undergo phase-transition from solid to liquid utilizing heat generated by absorbance of electromagnetic waves are being developed.

Operations of thermally activated valves sensitively depend on characteristics of a light source to transfer light energy to a valve material and light energy absorbance efficiency of the valve material.

First, when light energy absorbance efficiency of the valve material is low, light irradiation for a long time and high light source output are disadvantageously required in order to cause phase-transition of the valve material.

When light energy absorbance efficiency of the valve material is high, excessively long light irradiation time makes the valve material excessively hot, thus causing serious deformation of a substrate and biochemical variation of sample fluids adjacent to the valve material due to heat conduction. On the other hand, excessively short light irradiation time provides insufficient phase-transition, thus disadvantageously causing incomplete opening/closing of the valve.

In addition, since related art light sources may have non-uniform light intensity distribution, a portion of the valve may be excessively heated or not heated, although light irradiation time is accurately controlled, thus providing incomplete phase-transition. In particular, for example, these problems may be more serious in valve materials exhibiting poor heat conductivity such as paraffin.

There are differences in light intensity distribution between light sources having identical specifications. For this reason, disadvantageously, microfluidic devices separately using a plurality of light sources have different valve operation characteristics. In addition, upon mass-production of microfluidic devices, it is not easy to impart identical valve operation performance to the microfluidic devices due to the differences in light intensity distribution between light sources provided in the respective microfluidic devices.

For accurate testing of fluid samples accepted in microfluidic devices, the temperature of fluid samples required for the desired tests may be varied.

When the fluid sample temperature is lower than a desired test temperature, heating of the sample fluid is required to elevate the fluid sample temperature to a desired level. In this case, when light intensity distribution of light sources is non-uniform, uniform elevation of the fluid sample temperature is disadvantageously impossible.

In addition, uniform heating of fluid samples is required to perform a variety of tests such as acceleration of reactions of fluid samples with other materials, culturing of cells contained in fluid samples, extraction of nucleic acid through cell lysis, amplification of nucleic acid through polymerase chain reaction (PCR) cycles and the like. Similarly, non-uniform light intensity distribution of light sources disadvantageously makes uniform elevation of fluid sample temperature impossible.

SUMMARY

Exemplary embodiments provide a microfluidic device, a light irradiation apparatus, a microfluidic system including the same and a method for driving the same, to uniformly heat a fluid sample present in the microfluidic device.

Exemplary embodiments also provide a microfluidic device, a light irradiation apparatus, a microfluidic system including the same, and a method for driving the same, to accurately control operation of a valve present in the microfluidic device.

Exemplary embodiments also provide a microfluidic device, a light irradiation apparatus, a microfluidic system including the same, and a method for driving the same, to uniformly elevate the temperature of a fluid sample contained in the chamber of the microfluidic device.

In accordance with an aspect of an exemplary embodiment, there is provided a microfluidic system including: a microfluidic device including a chamber containing a fluid sample, a channel enabling flow of the fluid sample, and a valve to control flow of the fluid sample passing through the channel; a light irradiation apparatus to irradiate light energy to the microfluidic device; and a diffuser to diffuse and thus substantially uniformly distribute light irradiated from the light irradiation apparatus to an irradiation region of the microfluidic device.

The diffuser may be arranged on a light path between the light irradiation apparatus and the microfluidic device.

The diffuser may be arranged on the microfluidic device.

The diffuser may be formed by a method selected from sand-blasting, injection molding using a surface-treated die, applying a light-diffusion material to the substrate, adhering a light-diffusion film thereto and combinations thereof.

The diffuser may be mounted on the light irradiation apparatus.

The irradiation region may include at least one of the chamber containing a fluid sample and the valve.

The microfluidic system may further include: a mask to prevent light of the light irradiation apparatus from being irradiated outside of the irradiation region of the microfluidic device.

The mask may be made of a material absorbing or reflecting light.

The microfluidic system may further include: a lens provided between the diffuser and the valve, to concentrate light passing through the diffuser and irradiate the light to the microfluidic device.

The lens may be adhered to a surface of the microfluidic device, or injection-molded integrally with the substrate.

The diffuser may be mounted on the light irradiation apparatus.

The diffuser may include a light guide unit to receive light energy from the light irradiation apparatus and emit the light to the irradiation region.

The light guide unit may be a light pipe or an optical fiber.

The diffuser may include at least one of injected materials including ground glasses, sand-blasted glass/polymer, opal glasses, light-diffusion films and light-diffusion materials.

The light source of the light irradiation apparatus may be a laser, an LED, or a lamp operating at 0.1 Watts to 10 Watts.

The substrate may be a disc-shaped revolving body and further include a spindle to rotate the microfluidic device, and the microfluidic device may operate based on centrifugal force generated by rotation of the spindle, enabling the fluid sample to pass through the channel.

In accordance with an aspect of another exemplary embodiment, there is provided a microfluidic system including: a microfluidic device including a chamber containing a fluid sample, a channel enabling flow of the fluid sample, and a valve composed of a phase transition material to absorb light and then melt to control flow of the fluid sample passing through the channel; a light source to irradiate light energy to the valve; and a diffuser to diffuse light energy irradiated from the light source to allow the phase transition material to homogeneously melt.

The valve may further include microfluidic heat-generating materials, which are dispersed in the phase-transition material and absorb microwave energy irradiated from the outside and generate heat.

The microfluidic heat-generating material may be selected from the group consisting of polymer beads, quantum dots, gold (Au) nanoparticles, silver (Ag) nanoparticles, metal composite beads and magnetic beads and combinations thereof.

The microfluidic heat-generating material may be a metal oxide particle.

The microfluidic heat-generating material may include a dye emitting light in response to electromagnetic irradiation.

The phase transition material may be selected from waxes, gels, thermoplastic resins and combinations thereof.

The wax may be selected from the group consisting of paraffin waxes, microcrystalline waxes, synthetic waxes, natural waxes and combinations thereof.

The gel may include at least one selected from polyacrylamides, polyacrylates, polymethacrylates and polyvinylamides.

The thermoplastic resin may include at least one selected from cyclic olefin copolymers (COCs), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The microfluidic system may further include: a lens provided between the diffuser and the valve, to concentrate light passing through the diffuser and irradiate the light to the microfluidic device.

The diffuser may be arranged near the light source to impart spinning properties similar to a dot light source, to light passing through the diffuser.

The microfluidic system may further include: a mask to prevent light of the light irradiation apparatus from being irradiated outside of the irradiation region of the microfluidic device.

In accordance with an aspect of another exemplary embodiment, there is provided a microfluidic device including: a substrate including a microfluidic structure formed therein, the microfluidic structure including a chamber containing a fluid sample, a channel enabling flow of the fluid sample, and a valve composed of a phase transition material which melts upon absorbing energy, to control flow of the fluid sample passing through the channel; and a diffuser to diffuse and thus substantially uniformly distribute light irradiated from the light irradiation apparatus to an irradiation region of the microfluidic device.

The diffuser may be formed by a method selected from sand-blasting, injection molding using a surface-treated die, applying a light-diffusion material to the substrate, adhering a light-diffusion film thereto and combinations thereof.

In accordance with an aspect of another exemplary embodiment, there is provided a light irradiation apparatus for irradiating light to a microfluidic device including a chamber containing a fluid sample, a channel enabling flow of the fluid sample, and a valve to control flow of the fluid sample passing through the channel, the light irradiation apparatus including: a light source and a diffuser to diffuse and thus substantially uniformly distribute light irradiated from the light source to an irradiation region of the microfluidic device.

The light irradiation apparatus may further include: a lens provided between the diffuser and the valve, to concentrate light passing through the diffuser and irradiate the light to the microfluidic device.

The diffuser may include a light guide unit to receive light energy from the light irradiation apparatus and emit the light to the irradiation region.

In accordance with an aspect of another exemplary embodiment, there is provided a method for driving a microfluidic system including: obtaining position information of the chamber containing a fluid sample; aiming the light irradiation apparatus at the selected at least one fluid sample and irradiating light thereto by operating the spindle using the position information; diffusing the irradiated light using the diffuser; and supplying energy to a fluid sample contained in at least one chamber by the diffused light.

In accordance with an aspect of another exemplary embodiment, there is provided a method for driving a microfluidic system including: attaining position information of the chamber containing a fluid sample; aiming the light source at the selected at least one fluid sample and irradiating light thereto by operating the spindle using the position information; diffusing the irradiated light using the diffuser; and supplying energy to a fluid sample contained in at least one chamber by the diffused light to melt the phase transition material.

The aiming the light source at the fluid sample and irradiating light thereto may be carried out by rotating the substrate and moving the light source in a reverse diameter direction from an upper portion of the substrate.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
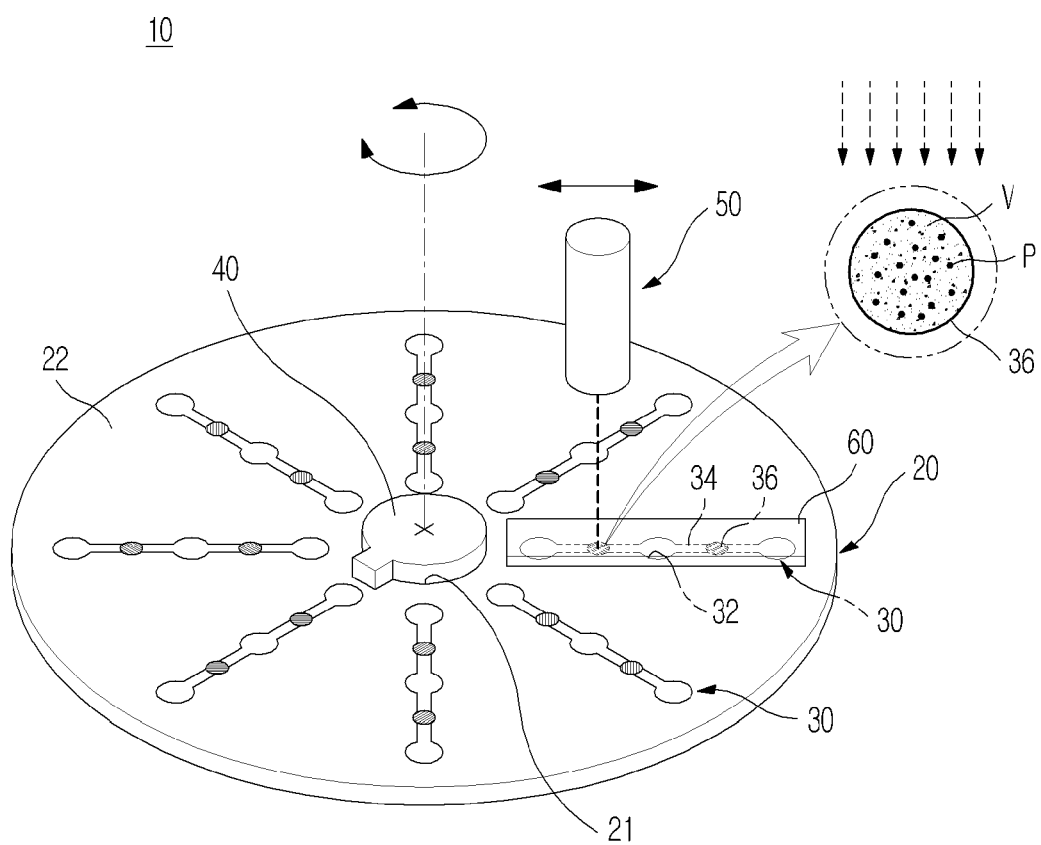
FIG. 1 is a perspective view illustrating a microfluidic system according to an exemplary embodiment.

A microfluidic device, a light irradiation apparatus, a microfluidic system including the same, and a method for driving the same according to exemplary embodiments will be described in detail with reference to the accompanying drawings, wherein like reference numerals refer to like elements throughout.

Structures such as chambers and channels illustrated in the drawings may have a simplified shape and be exaggerated or reduced in scale. The prefix "micro" of expressions such as "micro-fluidic device" or "micro-particle" only means the opposite of "macro", and is not to be construed as being limited to a specific size unit.

Figure 2:
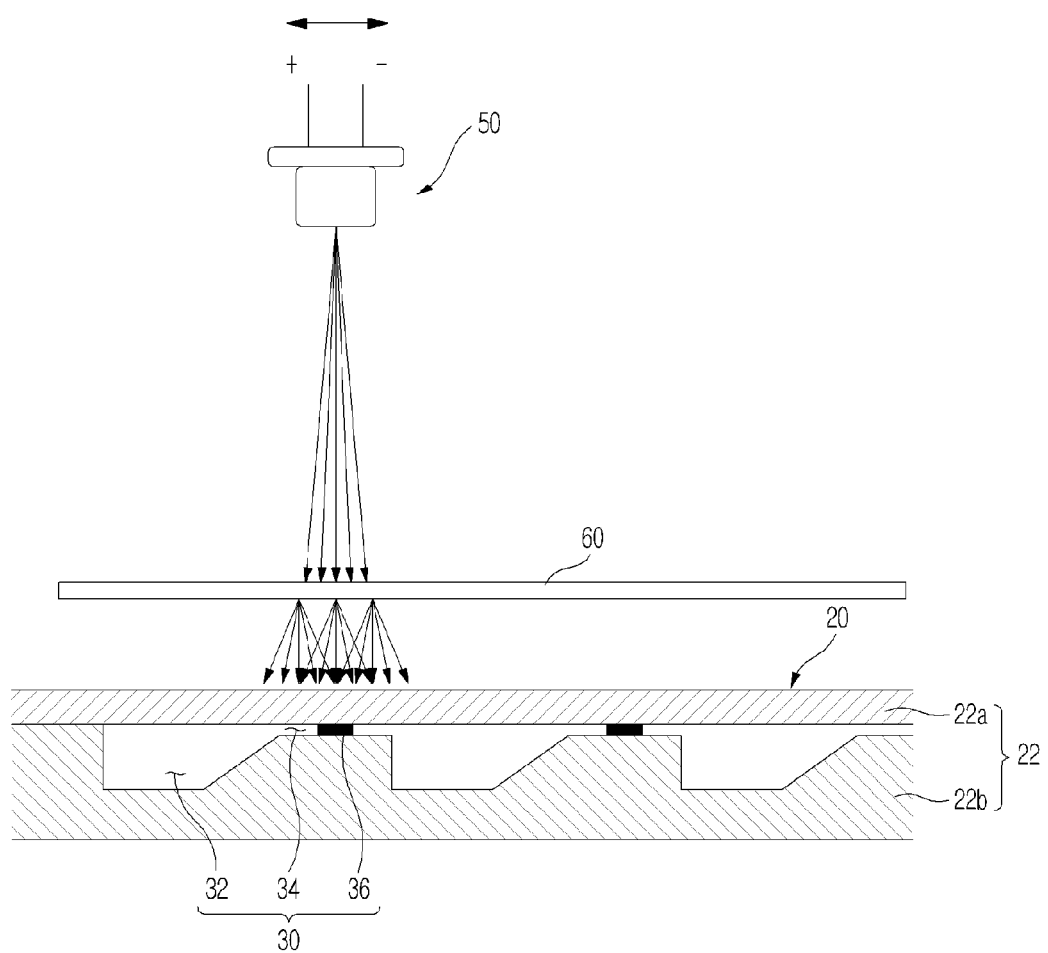
FIG. 2 is a sectional view illustrating a portion of a microfluidic system according to an exemplary embodiment.
Figure 3:
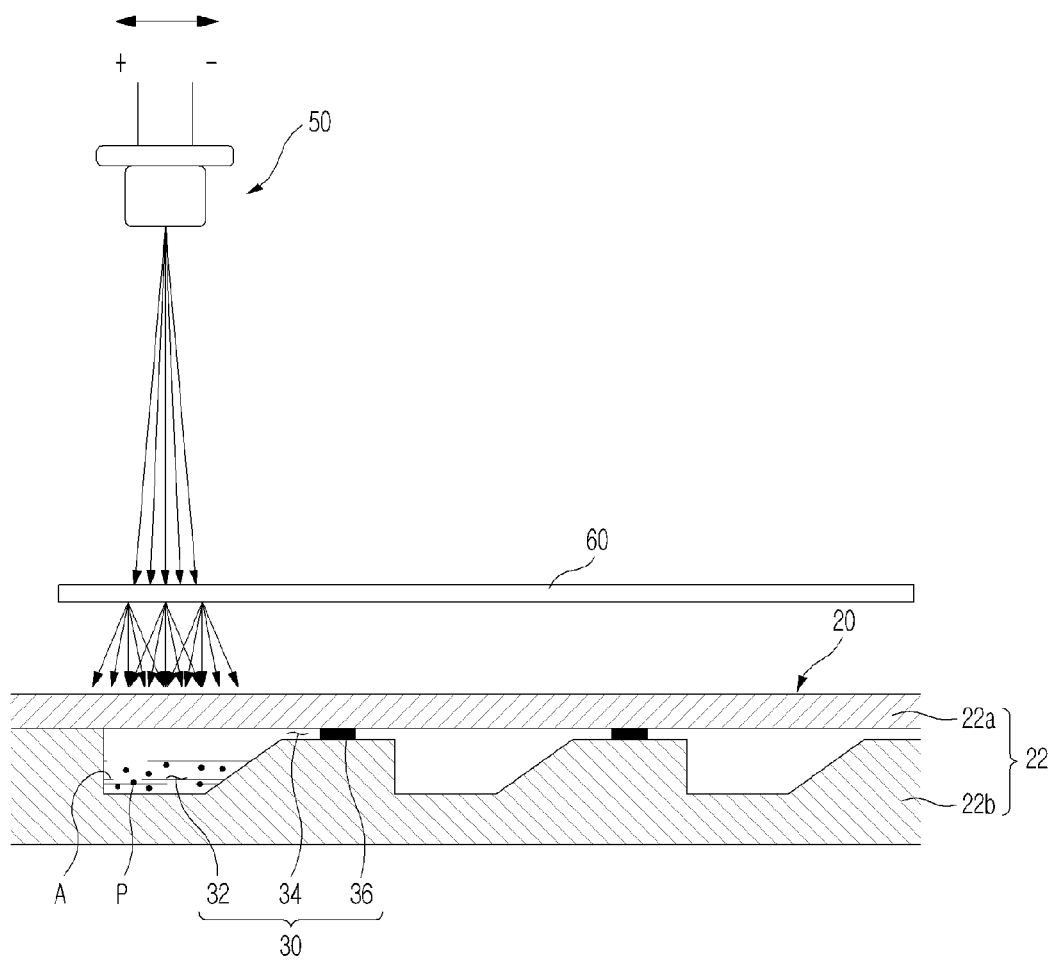
FIG. 3 is a view illustrating operation of the microfluidic system according to an exemplary embodiment.

FIG. 1 is a perspective view illustrating a microfluidic system according to an exemplary embodiment, FIG. 2 is a sectional view illustrating a portion of a microfluidic system according to an exemplary embodiment, and FIG. 3 is a view illustrating operation of the microfluidic system according to an exemplary embodiment.

Referring to FIG. 1, the microfluidic system 10 according to an exemplary embodiment includes a microfluidic device 20 provided with a chamber 32, a channel 34 and a valve 36, a spindle 40 to rotate the microfluidic device 20, a light irradiation apparatus 50 to irradiate the microfluidic device 20, and a diffuser 60 to diffuse and substantially uniformly distribute light irradiated from the light irradiation apparatus 50 to an irradiation region of the microfluidic device 20.

The microfluidic device 20 includes a disc-shaped rotatable substrate 22 and a microfluidic structure 30 provided in the substrate 22.

The substrate 22 can be readily molded and may be provided with a surface made of a biologically inert plastic material such as acryl or PDMS. Materials for the substrate are not limited thereto, and exhibit superior chemical and biological stability, as well as excellent optical transmission and mechanical processability.

The substrate 22 may be composed of a plurality of layers of plates, and grooves are formed in regions, where chambers or channels are formed, on the surface wherein adjacent plates come in contact with each other, and the grooves are joined together to provide chambers 32 and channels 34 in the substrate 22.

For example, the substrate 22 includes a first substrate 22a and a second substrate 22b adhered to the first substrate 22a. The first substrate 22a and the second substrate 22b are composed of a thermoplastic resin.

The first substrate 22a to the second substrate 22b may be adhered together by various methods such as adhesion using an adhesive agent or a double-sided adhesive tape, or fusion through, for example, ultrasonic wave fusion or laser fusion.

The microfluidic structure 30 includes at least one chamber 32 to accommodate a fluid sample, a channel 34 through which the fluid sample flows, connected to the chamber 32, and the valve 36 including a phase-transition material V that melts upon absorbing light energy, to control flow of the fluid sample which passes through the channel 34.

In addition, the microfluidic device 20 is mounted on the spindle 40 which rotates the microfluidic device 20 at a high speed. The microfluidic device 20 has a hole 21 at the center thereof, enabling the microfluidic device 20 to be mounted on the spindle 40. The centrifugal force generated by rotation of the spindle 40 causes fluids in the chamber 32 or the channel 34 of the microfluidic device 20 to be forced towards the perimeter of the substrate 22.

In the microfluidic device 20, locations of the chamber 32, the channel 34 and the valve 36 are determined depending on desired biochemical applications such as centrifugation, immune serum reactions, and gene analysis, extraction and amplification of fluid samples. That is, the chamber 32, the channel 34 and the valve 36 provided in the microfluidic structure 30 according to an exemplary embodiment are symbolically simplified from various shapes of structures which may be practically provided, in FIGS. 1 and 2, and the shape and structure of the microfluidic structure 30 is not limited to the shape and structure shown in the exemplary embodiment and may be designed to have various shapes according to applications thereof.

The microfluidic structure 30 is provided with at least two chambers 32 which serve as a storage chamber, a mixing chamber, a reaction chamber and a culture chamber.

The valve 36 may be provided in a region in which the chamber 32 contacts the channel 34 or in the middle of the channel 34 of the microfluidic device 20, and the channel 34 is provided in the middle of the channel 34 in an exemplary embodiment.

As shown in FIG. 1, the valve 36 is a thermally activated valve composed of a material containing the phase transition material V with a high melting point, and a plurality of microfluidic heat-generating materials P dispersed in the phase-transition material V, to absorb microwave energy irradiated from the outside and generate heat.

The fluid sample may be kept under conditions suitable for desired functions at a predetermined temperature, whereas the microfluidic heat-generating materials P are dispersed or aggregated in the fluid sample, to absorb energy irradiated from the outside of the microfluidic device 20 and transfer the same to adjacent samples, thereby increasing the temperature of the fluid sample.

The phase transition material with the dispersed microfluidic heat-generating materials P, for example, is injected in a molten phase into the channel 34 using a dispenser (not shown) and cured to cause the channel to close.

The phase transition material V of the valve 36 may be a wax, which is melted, liquidated and expanded upon heating. Examples of applicable waxes include paraffin waxes, microcrystalline waxes, synthetic waxes, natural waxes and the like.

The phase transition material V may be a gel or a thermoplastic resin. Examples of useful gels include polyacrylamides, polyacrylates, polymethacrylates, polyvinylamides and the like. In addition, examples of useful thermoplastic resins include cyclic olefin copolymers (COCs), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), polyvinylidene fluoride (PVDF) and the like.

The microfluidic heat-generating materials P may have a diameter of 1 nm to 100 μm so that they readily pass through the fine channels 34. For example, the microfluidic heat-generating materials P undergo rapid temperature elevation to emit heat, when electromagnetic energy is supplied by a method such as laser irradiation and are homogeneously distributed in the phase transition material. As such, the microfluidic heat-generating materials P may have a core-shell structure including a core containing a metal and a hydrophobic shell. For example, the microfluidic heat-generating materials P include a core composed of iron (Fe) and a plurality of surfactants bound to iron (Fe) to surround the iron (Fe).

The microfluidic heat-generating materials P may be stored in the form of a dispersion in a carrier oil. The carrier oil may be hydrophobic, to allow the microfluidic heat-generating materials P with a hydrophobic surface to be homogeneously distributed. The carrier oil, in which the microfluidic heat-generating materials P are dispersed, is added into the melted phase transition material V and the materials P are mixed with each other to prepare a valve material.

The microfluidic heat-generating materials P are not limited to polymer beads mentioned above, and may be quantum dots, magnetic beads, gold (Au) nanoparticles, silver (Ag) nanoparticles, beads composed of a metal composition or carbon particles. The carbon particles include graphite particles. In addition, the fine heat-emitting particles P, for example, may be metal oxide particles such as $Al_2O_3$, $TiO_2$, $Ta_2O_3$, $Fe_2O_3$, $Fe_3O_4$ or $HfO_2$.

In addition, the microfluidic heat-generating material P may be a dye which absorbs a predetermined spectrum of external electromagnetic waves and emits heat. Any dye may be used so long as it has a molecular structure miscible with the phase transition material. Examples of useful dyes include dyes with optical properties such as ADS905AM, infrared dyes with chemical formula $C_{62}H_{96}N_6SbF_6$ or infrared dyes (Epolight2057) available from American Dye Source Inc., infrared dyes available from Epolin Inc. with an absorption spectrum suitable for near infrared light sources, and dyes such as Epolight2180, Epolight2189, carbon black and the like.

The microfluidic system 10 includes the light irradiation apparatus 50 to irradiate electromagnetic waves and thus supply energy to a fluid sample accepted in the chamber 32 or the valve 36.

The light irradiation apparatus 50 irradiates electromagnetic waves with a predetermined wavelength selected from various wavelengths of electromagnetic waves such as microwave, infrared, visible, ultraviolet and X-rays.

In addition, the light irradiation apparatus 50 may intensely irradiate these electromagnetic waves near targets and may have a wavelength range in which the microfluidic heat-generating material P absorbs energy well. For the light irradiation apparatus 50, factors such as light sources to generate electromagnetic waves, and wavelength and output thereof may be determined depending on ingredients of and surface conditions of microfluidic heat-generating materials P contained in the microfluidic device.

The light source of the light irradiation apparatus, for example, may have an output of 0.1 Watts to 10 Watts, and may be a laser light source to irradiate laser beams, a light emitting diode to irradiate visible or infrared light or a xenon lamp (Xenon). The laser light source may include at least one laser diode.

The microfluidic system 10 may include a position adjustment unit (not shown) to control the position and/or direction of the light irradiation apparatus 50 and thus intensely transfer electromagnetic waves emitted therefrom to a desired region of the microfluidic device 20. In an exemplary embodiment, the position adjustment unit moves the light irradiation apparatus 50 in the arrow direction represented in an upper portion of the light irradiation apparatus 50, that is, in a radial direction of the disc-shaped microfluidic device 20. The position adjustment unit, which causes the light irradiation apparatus 50 to move along a straight line, may be realized through various mechanisms, is apparent to those skilled in the art and a detailed explanation thereof is thus omitted.

In addition, the spindle 40 rotates the microfluidic device 20. Although not illustrated in the drawings, the microfluidic system 10 includes a motor to rotate the microfluidic device 20 at a constant speed in a forward or reverse direction, that is, at a predetermined speed and at a predetermined angle, if necessary, and one or more elements related to the motor. Similar to the position adjustment unit (not shown) of the light irradiation apparatus 50, a detailed explanation of the spindle 40 is omitted.

In the microfluidic system 10 shown in FIG. 1, the light irradiation apparatus 50 intensively irradiates electromagnetic waves to irradiation regions of the microfluidic device 20, that is, the chambers 32 containing fluid samples to be irradiated and/or the valves 36.

The microfluidic system 10 includes a diffuser 60 to diffuse light energy irradiated from the light irradiation apparatus 50 to irradiation regions of the microfluidic structure 30 and thus uniformly distribute the light thereto.

As shown in FIGS. 1 and 2, the diffuser 60 may be provided in the form of a long rectangle in a lower region of the light irradiation apparatus 50 to cover the lower region of a flow path of the position adjustment unit of the light irradiation apparatus.

For example, the diffuser 60 is provided on a light path formed between the light irradiation apparatus 50 and the microfluidic device 20.

The diffuser (i.e., light diffusion medium) diffuses light emitted from a predetermined direction to various directions. For this reason, after passing through the diffuser 60, light has an increased diffusion angle and decreased light intensity variation according to diffusion angles, as shown in FIG. 2.

In an exemplary embodiment, the diffuser 60 may be positioned in a region provided between the light irradiation apparatus 50 and the microfluidic device 20. However, the diffuser 60 may be positioned in the microfluidic device 20, that is, near the side of the first substrate 22a, when it has high diffusion capability, and the microfluidic device 20 may be positioned near a light source of the light irradiation apparatus 50, when it has low diffusion capability. As the distance between the diffuser 60 and the microfluidic device 20 increases, light intensity distribution becomes more uniform, but light energy loss may increase. Through various tests, a suitable position of the diffuser 60 may be optimized.

For example, the diffuser 60 may be a medium selected from ground glass, sand-blasted glass/polymer, opal glass, light-diffusion films for a liquid crystal display (LCD) backlight unit (BLU), light-diffusion films for LCD protection and various kinds of light-diffusion resins.

Next, a microfluidic device and a microfluidic system including the same according to another embodiment will be described.

Figure 4:
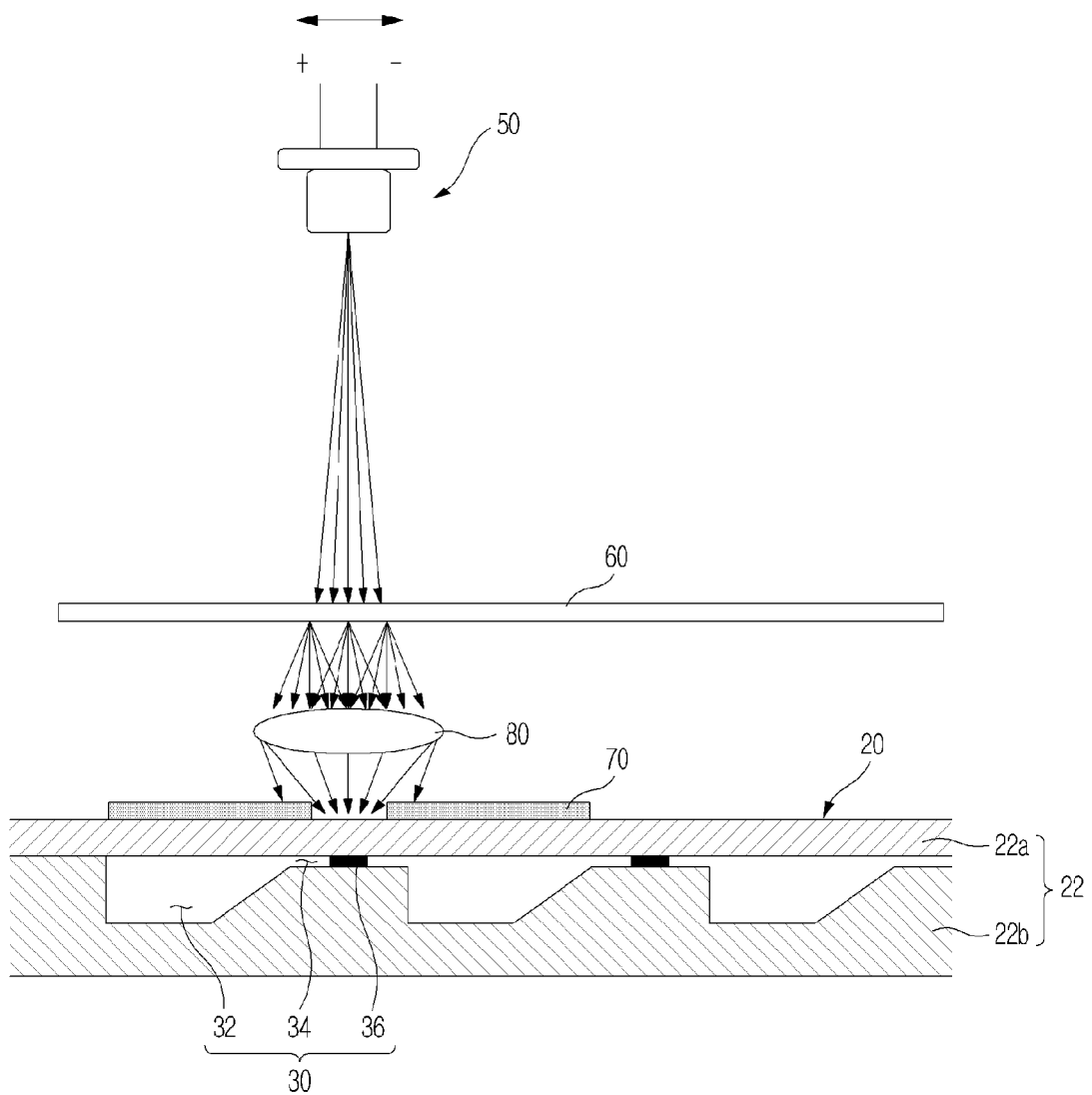
FIG. 4 is a sectional view illustrating a portion of a microfluidic system according to another exemplary embodiment.

FIG. 4 is a sectional view illustrating a portion of a microfluidic system according to another exemplary embodiment.

The exemplary embodiment illustrated in FIG. 4 is the same as the exemplary embodiment illustrated in FIG. 2 except that a mask 70 and a lens 80 are further provided.

The following other exemplary embodiments employ elements different from those of the exemplary embodiment of FIG. 2 and the same elements are denoted by the same reference numerals and a detailed explanation thereof is thus omitted.

The microfluidic system 10 shown in FIG. 4 further includes the mask 70 provided with a window having a size corresponding to or larger than the size of the valve 36, and the lens 80, provided between the diffuser 60 and the valve 36, to focus light emitted from the diffuser 60.

The mask 70 may be composed of a material or structure to absorb or reflect light to prevent light diverged to the outside of irradiation regions from being irradiated to the microfluidic device 20. As shown in FIG. 4, the mask 70 is realized on the upper surface of the first substrate 22a, may be integrated with the microfluidic device 20 and may be provided in an area provided between the diffuser 60 and the microfluidic device 20.

The lens 80 may be provided in the form of a convex lens between the diffuser 60 and the valve 36, to concentrate light, which passes through the diffuser 60 and is then emitted, on the side of the valve 36 and thus improve light efficiency, thereby enabling reliable operation of the valve 36, although a low output laser light source is used.

A light-concentration level can be optimized by suitably setting the focus distance and position of the lens 80.

The microfluidic system 10 may be provided with both a mask 70 and a lens 80, as shown in FIG. 4, and may be provided with either the mask 70 or the lens 80.

Next, a microfluidic device and a microfluidic system including the same according to another exemplary embodiment will be described.

Figure 5:
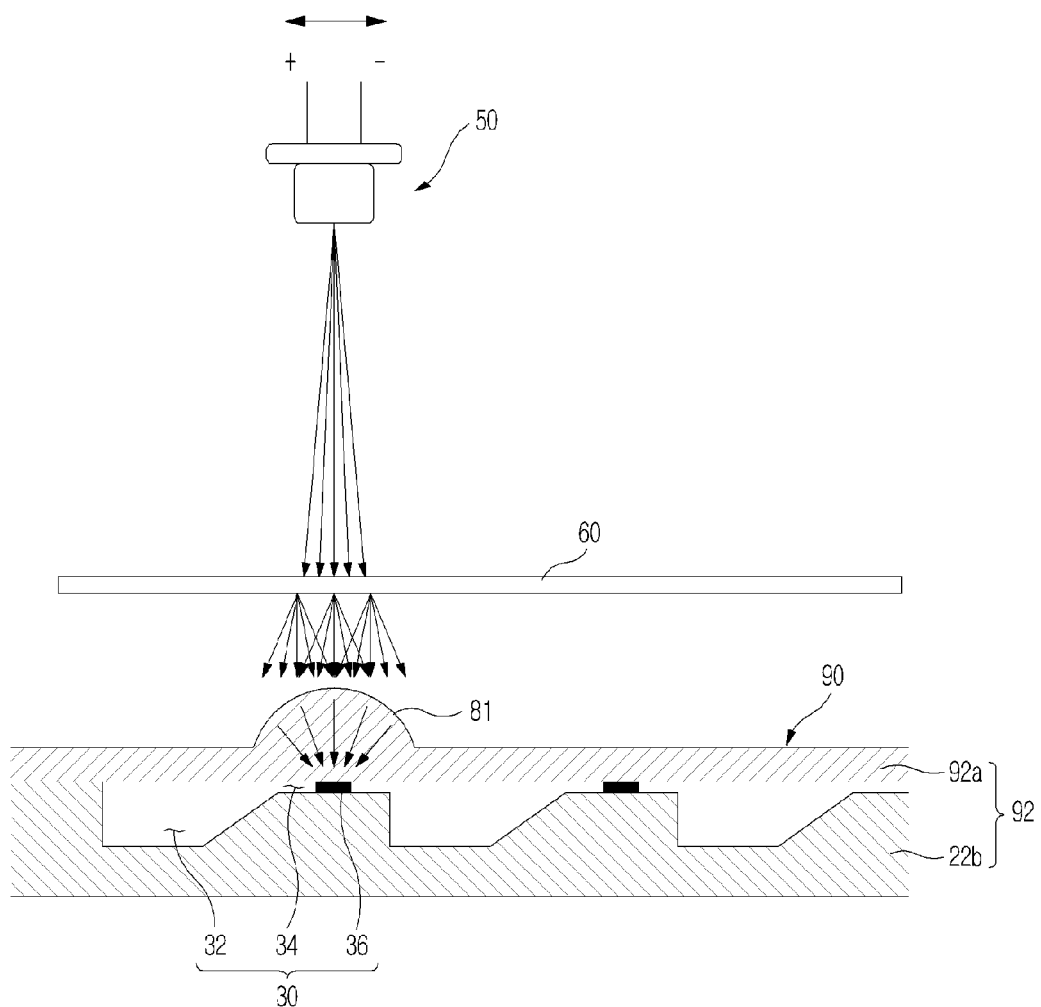
FIG. 5 is a sectional view illustrating a portion of a microfluidic system according to another exemplary embodiment.

FIG. 5 is a sectional view illustrating a portion of a microfluidic system according to another exemplary embodiment.

This exemplary embodiment is the same as the exemplary embodiment illustrated in FIG. 2 except that a lens is added and thus integrated with the microfluidic device.

The microfluidic system 10 according to the exemplary embodiment shown in FIG. 5 may be provided with a lens 81, performing the same functions as the lens 80 shown in FIG. 4, which is integrated with a substrate 92.

Accordingly, the microfluidic device 90 eliminates the necessity of mounting the lens and a lens barrel on the external surface thereof and the lens 81 can be formed integrally with the first substrate 22a by injection molding, thus enabling reduction of manufacturing costs of the microfluidic system.

Next, a microfluidic device and a microfluidic system including the same according to another exemplary embodiment will be described.

Figure 6:
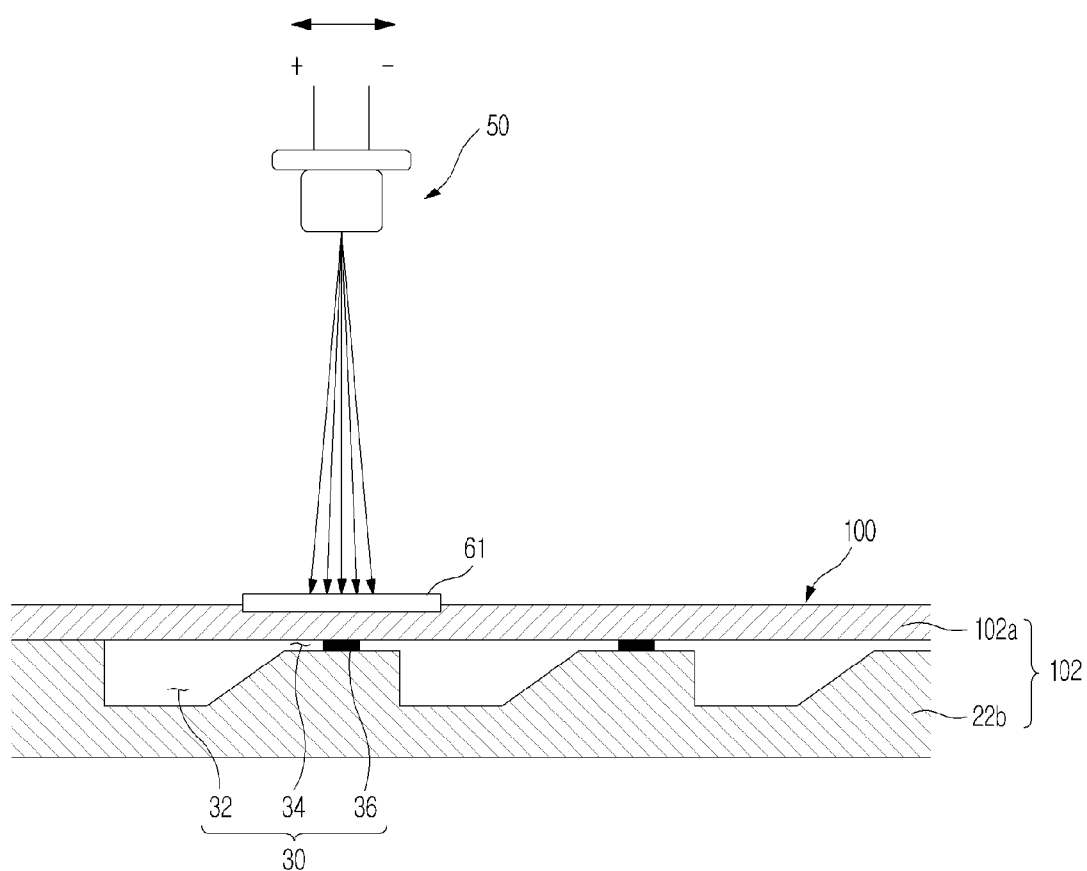
FIG. 6 is a sectional view illustrating a portion of a microfluidic system according to another exemplary embodiment.

FIG. 6 is a sectional view illustrating a portion of a microfluidic system according to another exemplary embodiment.

This exemplary embodiment is the same as the exemplary embodiment illustrated in FIG. 2 except that a diffuser 61 is integrated with the microfluidic device 100.

The microfluidic system 10 according to the exemplary embodiment shown in FIG. 6 may be provided with the diffuser 61 which is integrated with the upper surface of a first substrate 102a of the microfluidic device 100.

A diffuser having superior light-emission capabilities can uniformize light diffusion and light intensity even at a short distance. For this reason, the diffuser 61 integrates with the first substrate 102a, thus reducing manufacturing costs of the microfluidic system 10.

For example, the diffuser 61 can be provided on the substrate 22 by sand-blasting, integrally molding the substrate provided with a diffuser using a surface-treated die used for injection molding performed on the substrate, or applying a light-diffusion material to the substrate or adhering a light-diffusion film thereto.

Next, a light irradiation apparatus and a microfluidic system including the same according to another exemplary embodiment will be described.

Figure 7:
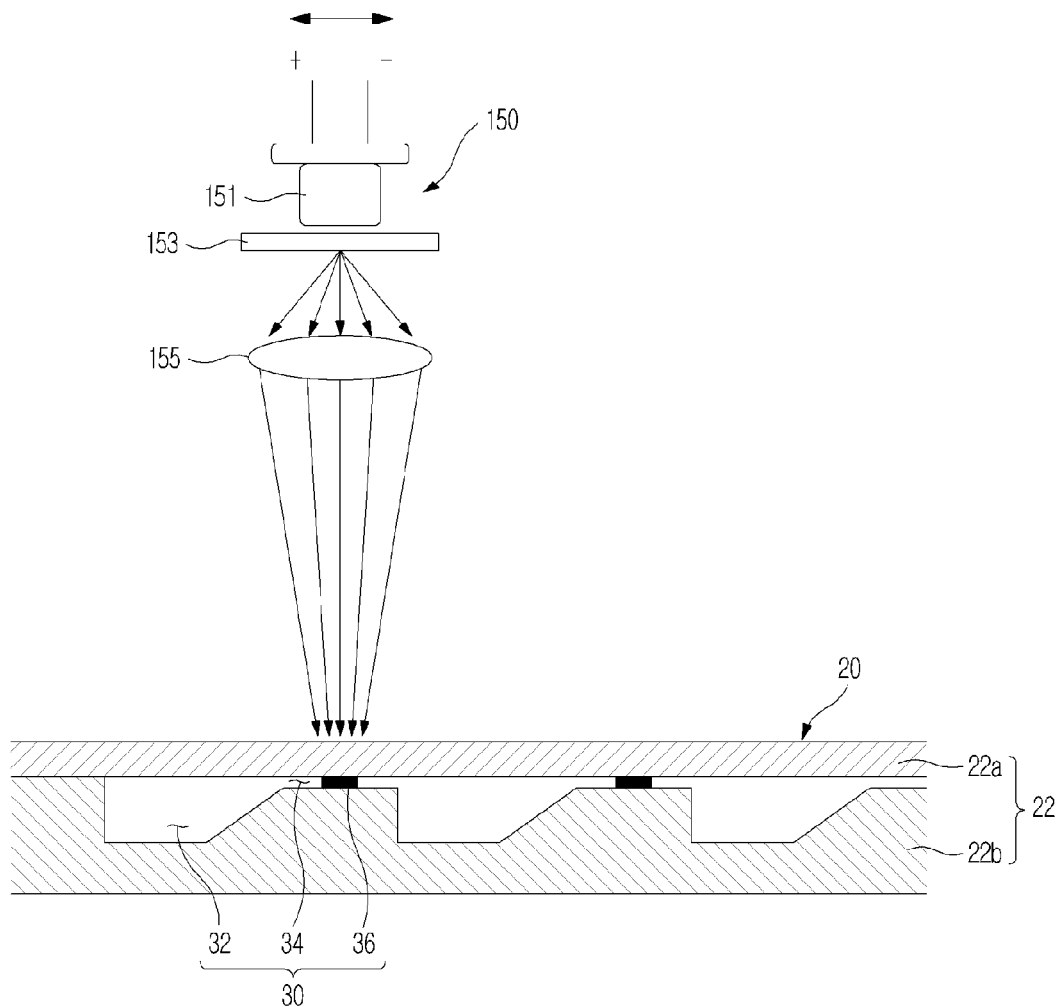
FIG. 7 is a sectional view illustrating a portion of a microfluidic system according to another exemplary embodiment.

FIG. 7 is a sectional view illustrating a portion of a microfluidic system according to another exemplary embodiment.

This exemplary embodiment is the same as the exemplary embodiment illustrated in FIG. 2 except that a lens is provided and a position of a diffuser is different.

The microfluidic system 10 according to the exemplary embodiment shown in FIG. 7 may be provided with a light irradiation apparatus 150 including a diffuser 153 and a lens 155. That is, the diffuser 153 is arranged under the light source 151 such that it is near the light source 151, and a lens 155 to concentrate light emitted from the diffuser 153 is arranged in a lower region of the diffuser 153.

The diffuser 153 and the lens 155 are provided in the light irradiation apparatus 150 such that they are arranged near the light source 151, to minimize stray light diverged to the outside of irradiation regions and thereby maximize light efficiency.

Accordingly, the valve 36 can be operated even by a low output light source, and the diffuser 153 and the lens 155 can be directly adhered to the light irradiation apparatus 150, thus reducing manufacturing costs of the microfluidic system 10. Beam size and orientation angle can be minimized and effects of stray light on reagents or fluids provided near the valve 36 can thus be minimized.

Next, a light irradiation apparatus and a microfluidic system including the same according to another exemplary embodiment will be described.

Figure 8:
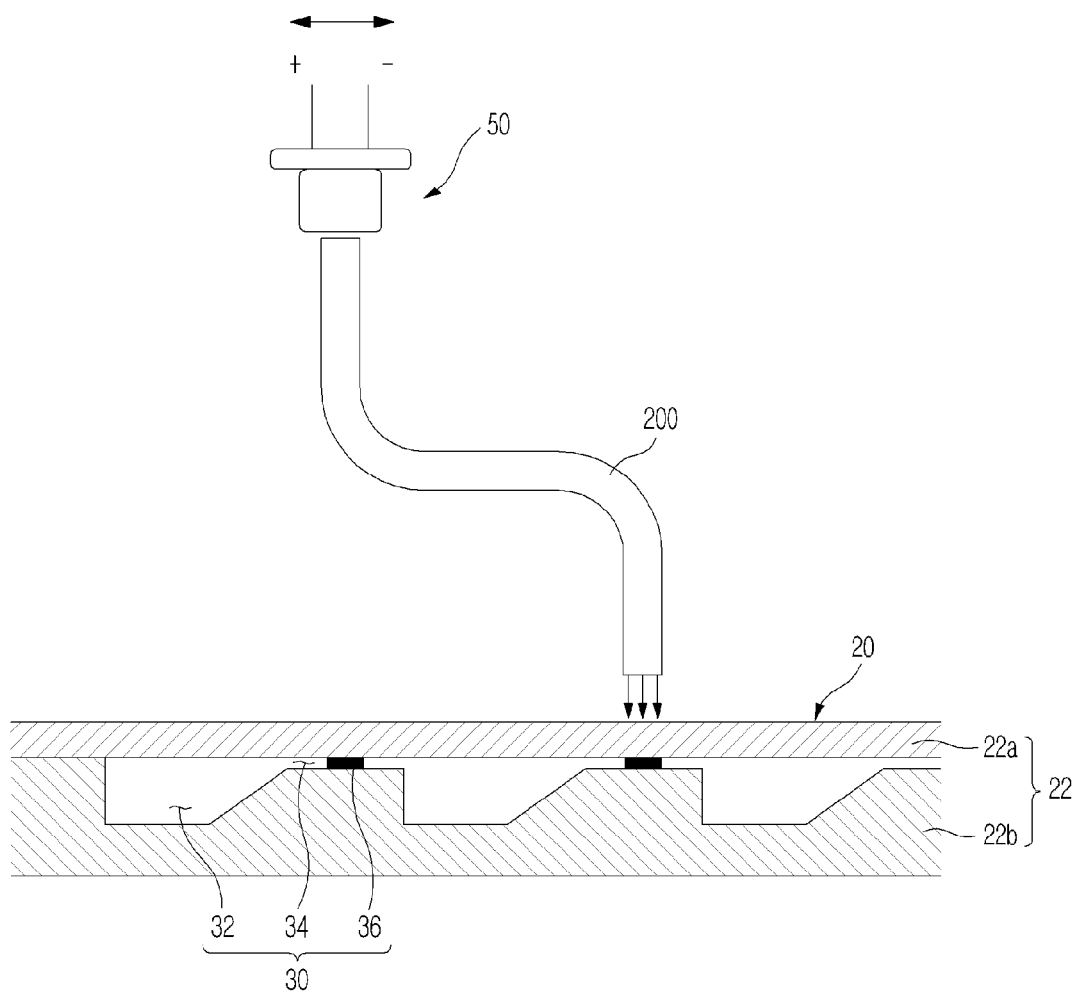
FIG. 8 is a sectional view illustrating a portion of a microfluidic system according to another exemplary embodiment.

FIG. 8 is a sectional view illustrating a portion of a microfluidic system according to another exemplary embodiment.

This exemplary embodiment is the same as the exemplary embodiment illustrated in FIG. 2 except that a light guide unit 200 is used as a diffuser to emit light.

For example, the light guide unit 200 may be a light pipe or an optical fiber. The light guide unit 200 guides light of the light irradiation apparatus 50 to irradiation regions of the microfluidic device 20 to uniformize light intensity distribution of the light source.

The input terminal of the light guide unit 200 extends to the side of the light source of the light irradiation apparatus 50 and the output terminal thereof extends to the side of irradiation regions of the microfluidic device 20.

Light irradiated from the light source to the light guide unit 200 does not escape outside and is guided, while being repeatedly reflected, and is then uniformly distributed. The light guide unit 200 such as a light pipe or an optical fiber is composed of a flexible material and may thus be deformed. For this reason, when the position of the output terminal is controlled regardless of the position of the light source, light with substantially uniform intensity distribution can be supplied to irradiation regions of the microfluidic device 20 using the light guide unit 200.

Hereinafter, a method for driving a microfluidic system according to an exemplary embodiment will be described with reference to FIGS. 2 and 3.

The following operation method is applicable to the aforementioned embodiments of the microfluidic system.

First, when the microfluidic device 20 is mounted on the spindle 40 of the microfluidic system 10, the microfluidic system 10 attains position information of the valve 36 to be opened and position information of the chamber 32 containing fluid samples to be heated, included in the microfluidic device 20. A variety of methods for obtaining position information may be utilized. For example, position information of the microfluidic structure 30 in the microfluidic device 20 used for an information storing portion (not shown) of the microfluidic system 10 is pre-stored, and when each microfluidic device 20 is considered to be mounted on the spindle 40, position information of the microfluidic structure 30 present in the corresponding microfluidic device 20 is loaded and then used for system operation. In this case, the microfluidic system 10 can obtain information for subsequent operations only by confirming the position of a base point. As another example, the microfluidic device 20 can obtain position information of the valve 36, the channel 34, or the chamber 32 by imparting reference numerals to the valve 36, the channel 34, or the chamber 32 or a position corresponding thereto and allowing the microfluidic system 10 to recognize the reference numerals.

Next, the light irradiation apparatus 50 is pointed towards at least one valve 36 or the chamber 32 containing a fluid sample A using position information thus obtained.

The pointing of the light irradiation apparatus 50 is carried out by detecting deviation between the position of the valve 36 selected on the microfluidic device 20 (or the position of the chamber 32 containing a fluid sample) and the position to which electromagnetic waves of the external energy source reach, based on a pointing initiation time, and controlling the target of the electromagnetic waves within the deviation using the spindle 40 and the position adjustment unit of the light irradiation apparatus. For example, the microfluidic device 20 forwardly and reversely rotates using the spindle 40, such that the light irradiation apparatus 50 and the valve 36 (or chamber 32) are arranged at the equal angle, and the light irradiation apparatus 50 is moved in a radial direction using the position adjustment unit of the light irradiation apparatus, to allow the light irradiation apparatus 50 to aim at the selected valve.

Selection of the valve 36 (or chamber 32), that the light irradiation apparatus 50 targets, is carried out by user input, or a preset program. In particular, in the case where the microfluidic device 20 includes a plurality of valves 36 and chambers 32 and these elements sequentially operate, control through programs is preferable.

Next, light is irradiated to the targeted valve 36 (or chamber 32).

The irradiated light is diffused through the diffuser 60, energy is supplied to the selected valve 36 or chamber 32 by the diffused light and the phase transition material is homogeneously melted, to open the channel 34, or a fluid sample A is uniformly heated by the microfluidic heat-generating material P distributed in the fluid sample A of the chamber 32.

Accordingly, light irradiated from the light irradiation apparatus 50 is supplied through the diffuser 60 to the valve 36 and the microfluidic heat-generating material P of the valve 36 is thus heated, to accurately control operations of the valve 36, and the deviation between a plurality of light sources of the light irradiation apparatus 50 causes uniform operation of the valve 36.

In addition, light irradiated from the light irradiation apparatus 50 is uniformly supplied through the diffuser 60 to the chamber 32, thus uniformly heating fluid samples and thereby imparting an optimum temperature suitable for required tests to the fluid samples.

Although a microfluidic system provided with a single light irradiation apparatus is illustrated in the afore-mentioned exemplary embodiments, a plurality of light irradiation apparatuses including a single light source and diffusers equal in number to the number of the light irradiation apparatuses in one microfluidic system may be provided.

Accordingly, when a plurality of light irradiation apparatuses having a single light source are provided in the microfluidic system and a plurality of light sources are simultaneously used, operation conditions of the light sources can be uniformized. As a result, valve operation characteristics can be secured and a predetermined temperature can thus be imparted to fluid samples although light intensities of light sources are varied.

In addition, difference in valve operation characteristics between a plurality of microfluidic systems using an identical light source and difference in temperature between fluid samples can be minimized.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A microfluidic system comprising:
   a microfluidic device comprising a chamber which contains a fluid sample, a channel which is connected to the chamber and through which the fluid sample flows, and a valve which controls flow of the fluid sample through the channel, the valve comprising a phase transition material;
   an irradiation apparatus which irradiates electromagnetic energy;
   a diffuser which diffuses and distributes in various directions the electromagnetic energy irradiated by the irradiation apparatus in a predetermined direction to an irradiation region of the microfluidic device, such that the electromagnetic energy after passing through the diffuser has an increased diffusion angle and decreased intensity variation according to diffusion angles, as compared to the electromagnetic energy prior to passing through the diffuser; and
   a lens which is provided between the diffuser and the valve, to concentrate light passing through the diffuser and irradiate the light to the valve of the microfluidic device, wherein the lens is adhered to an exterior surface of, or injection-molded integrally with the exterior surface of, the channel of the microfluidic device.

2. The microfluidic system according to claim 1 wherein the irradiation apparatus irradiates light of a predetermined wavelength.

3. The microfluidic system according to claim 2, wherein the valve comprises a phase transition material and heat-generating materials dispersed in the phase transition material.

4. The microfluidic system according to claim 2, wherein the irradiation region includes at least one of the valve and the chamber containing a fluid sample.

5. The microfluidic system according to claim 2, further comprising:

a mask which prevents the light irradiated by the irradiation apparatus from being incident on portions of the microfluidic structure outside of the irradiation region of the microfluidic device.

6. The microfluidic system according to claim 5, wherein the mask is made of a material absorbing or reflecting light.

7. The microfluidic system according to claim 2, wherein the diffuser includes at least one of injected materials including ground glass, sand-blasted glass/polymer, opal glass, light-diffusion films and light-diffusion materials.

8. The microfluidic system according to claim 2, wherein the light source of the light irradiation apparatus is a laser, a light emitting diode, or a lamp operating at 0.1 Watts to 10 Watts.

9. The microfluidic system according to claim 2, wherein the microfluidic device is disc-shaped, the microfluidic system further comprising a spindle which rotates the microfluidic device, to generate centrifugal force enabling the fluid sample to pass through the channel.

* * * * *